United States Patent
Watanabe et al.

(10) Patent No.: US 7,263,043 B2
(45) Date of Patent: Aug. 28, 2007

(54) OPTICAL DISK APPARATUS FOR OPTIMIZING LASER POWER DURING RECORDING

(75) Inventors: Mitsuo Watanabe, Iruma (JP); Naoto Takeda, Tokyo (JP)

(73) Assignee: TEAC Corporation, Musashino-shi (JP)

( * ) Notice: Subject to any disclaimer, the term of this patent is extended or adjusted under 35 U.S.C. 154(b) by 660 days.

(21) Appl. No.: 10/743,590

(22) Filed: Dec. 22, 2003

(65) Prior Publication Data

US 2004/0136303 A1    Jul. 15, 2004

(30) Foreign Application Priority Data

Dec. 25, 2002   (JP) ............................. 2002-375254

(51) Int. Cl.
G11B 7/00   (2006.01)

(52) U.S. Cl. ............... 369/47.5; 369/47.51; 369/275.4; 369/53.36; 369/116

(58) Field of Classification Search .................... None
See application file for complete search history.

(56) References Cited

U.S. PATENT DOCUMENTS 5,126,994 A * 6/1992 Ogawa et al. .............. 369/116
5,684,765 A   11/1997 Matsumoto et al.
6,815,035 B2 * 11/2004 Bennett et al. ............ 428/65.1

FOREIGN PATENT DOCUMENTS

| JP | 9-63057     | 3/1997  |
|----|-------------|---------|
| JP | 11-39803    | 2/1999  |
| JP | 11045440    | 2/1999  |
| JP | 2002260230  | 9/2002  |
| JP | 2002-358638 | 12/2002 |

* cited by examiner

Primary Examiner—Tan Xuan Dinh
Assistant Examiner—Joseph Haley
(74) Attorney, Agent, or Firm—Christensen O'Connor Johnson Kindness PLLC

(57) ABSTRACT

An optical disk drive for optimizing laser power to be used at the time of recording operation. In a DVD-R drive and a DVD-RW drive, a controller performs OPC to set recording power and records RMD serving as recording management data in an RMA serving as a recording management area. The RMD are verified. When the RMD can be read, the number of PI errors in the RMD is detected. If the number of PI errors is equal to or less than an allowable value, data are recorded in a data area at that recording power. If the number of PI errors exceeds the allowable value, OPC is again performed, to thereby reset the recording power.

4 Claims, 6 Drawing Sheets

OPTICAL DISK APPARATUS FOR OPTIMIZING LASER POWER DURING RECORDING

BACKGROUND OF THE INVENTION

1. Field of the Invention

The present invention relates to an optical disk apparatus, and more particularly, to optimization of recording conditions employed by an optical disk apparatus capable of recording data.

2. Related Art

According to a known technique, when data are recorded by means of a CD-R/RW drive, a DVD-R/RW drive, or the like, test data are recorded in a test area on an optical disk (e.g., a power calibration area; i.e., a PCA area). Recording power is optimized on the basis of the quality of a signal reproduced from the test data. Such a technique is generally called optimum power control (OPC), and the power optimized through OPC is used in recording data in data areas of an optical disk.

FIG. 6 shows, as an example, a flow chart pertaining to data recording processing to be performed by a DVD-RW drive. First, when a DVD-RW disk is loaded into a drive, a controller provided in the drive performs OPC operation (S101). Specifically, this is performed by sequentially recording test data in PCA areas while laser power is changed in increments of 0.5 mW. For each level of laser power, the quality of a reproduced signal produced by reproduction of the test data is evaluated. A β value, a degree of modulation "m," a γ value, jitter, or the like is used as the quality of the reproduced signal. For example, when a β value is used as a parameter for evaluating the quality of the reproduced signal, the β value representing the quality of the reproduced signal is compared with a preset target β value, whereby laser power closest to the target β value is extracted. After execution of OPC, the thus-extracted laser power is set to recording power (S102).

After recording power has been set, RMD (recording management data) serving as management data are recorded in an RMA serving as a recording management area of the DVD-RW (S103). After recording of the management data RMD, verification is made as to whether or not the RMD have been recorded without fail (S104). The reason for this is that, if the RMD fail to be read, the DVD-RW cannot be activated; or even if the DVD-RW can be activated, the extent to which data have been recorded becomes unknown because of absence of management data, thereby hindering accurate recording of data. If the result of verification shows that the RMD cannot be read, RMD will again be written or OPC will again be performed in order to optimize recording power and write RMD, thus performing verification. In contrast, if the result of verification is positive; that is, if the RMD can be read, data are recorded in the data areas at the recording power set in S102 (S105).

FIG. 7 shows a data format of the DVD-RW. A PCA (power calibration area), an RMA (recording management area), a lead-in area, and data areas are present on the DVD-RW. An RMA lead-in and RMD are recorded in the RMA. The RMA lead-in includes an ID of a drive manufacturer, a serial number, a disk ID, or the like. Further, the RMD include OPC-related information, data area information, recording mode information, or the like. The RMD are made up of 28 sets of data ranging from set 1 to set 28. Each set includes five blocks. Each block includes a concatenation loss area and Fields 0 to 14. Each block has a size of 32 KB. Different information items are recorded in the Fields 0 to 14 in accordance with the mode of the DVD-RW (i.e., an incremental mode, a disk-at-once mode, or an overwrite mode). For instance, in an incremental mode (which is a write-once mode, and data can be sequentially recorded; when recording of data has been completed, information about completion of the data is recorded in the RMA), common information is recorded in Field 0; OPC information and information about a pointer of an RMD set are recorded in Field 1; and data designated by the user and erasing operation information are recorded in Field 2. The erasing operation information shows an erasing position and the number of times erasing operation has been performed.

If the RMD serving as management data can be verified and read, data supplied from a higher-level apparatus are recorded in data areas. If a record margin is small, there will arise a case where, even if RMD can be read, data cannot be read after having been actually recorded in the data areas. The reason for this is that during the verification operation for the RMD verification is made solely as to whether or not RMD can be read; the recording quality of the data are not quantitatively evaluated. The quality of the data recorded in the data areas is not ensured. Particularly, a wide variety of optical disks are circulated in the market, and variations exist in a characteristic of a recording film. There often arises a case where, even when an attempt is made to reproduce data recorded by a certain drive through use of another drive, the attempt ends in a failure because recording power is not always optimal.

In order to prevent occurrence of such a failure, there have been proposed a techniques for ensuring recording quality by further optimizing recording power obtained through OPC. For instance, according to one technique, a CD-RW drive records data in data areas at the recording power obtained through OPC and detects errors by reproducing the data. When the errors exceed an allowable value, OPC is again performed, thereby optimizing recording power. The data written in the data area are overwritten at the thus-obtained recording power. Alternatively, according to another technique, when OPC is performed in the test area, the quality of a signal reproduced from the test data is recorded, along with errors in the signal, whereby recording laser power is set to laser power at which the errors are reduced to an allowable value or less. Please refer to the following publications for the above-described techniques.

Japanese Patent Laid-Open Publication No. Hei 11-45440

Japanese Patent Laid-Open Publication No. 2002-260230

However, in the case of a configuration in which data are recorded in data areas and errors in the data are detected, to thereby again perform OPC, data are written in data areas for a trial, thereby presenting a problem of consumption of data areas. The data written in the data areas for a trial must be overwritten. In principle, the technique is limited to a CD-RW disk or the like. Another problem is that the technique cannot be applied to a disk which does not enable overwriting of data. Even in the case of a configuration in which test data are recorded in a test area (i.e., a PCA) and errors in the test data are detected, extra test data must be recorded for detecting errors (at least test data corresponding to 16 sectors which are equal to one ECC block, and test data of at least this quantity must be recorded for each of a plurality of laser power levels), thus consuming the test area. Further, a time required to perform OPC is a wait time for the user during which data are not recorded. In view of convenience, an increase in the time required to record test data is not preferable.

SUMMARY OF THE INVENTION

The invention provides an optical disk apparatus capable of optimizing recording power to be employed at the time of recording of data, without involvement of unnecessary consumption of a test area and a data area on an optical disk.

An optical disk apparatus according to the invention includes: setting means which records test data in a test area on an optical disk and sets recording power in accordance with the quality of a reproduced signal obtained by reproducing the test data; means for recording management data in a recording management area on the optical disk through use of the recording power; means for verifying the recorded management data; detection means for detecting the number of errors in the management data when a result of verification is positive; comparison means for comparing the number of the errors with an allowable value; and correction means for correcting the recording power when the number of the errors exceeds the allowable value. Even when the management data are verified and a result of verification is positive; that is, when the management data can be read, data are not recorded at that recording power, and errors in the management data are evaluated quantitatively. When the number of errors in the management data exceeds the allowable value, data may be considered not to be recorded at high quality even when recorded at that recording power; for example, another drive may be considered to fail to reproduce recorded data. Thus, the recording power is corrected and reset. According to the invention, recording quality is evaluated by utilization of a management data recording operation which is indispensable at the time of recording of data. Operation for resetting recording power is made efficient.

In one embodiment of the invention, the correction means causes the setting means to repeatedly perform setting operation by changing a setting method employed by the setting means, thus correcting recording power. The reason why the setting method is changed is that the recording power cannot be corrected efficiently with the same processing algorithm as that employed when first OPC is performed, which may result in unwanted consumption of a PCA. Here, a mode for changing settings may be changed in accordance with the number of errors in management data.

The correction means can employ any of a variety of methods for changing the setting method. For example, the recording power can be corrected by increasing or decreasing the recording power by a predetermined level or proportion. Further, the recording power may be corrected by means of causing the setting means to repeatedly perform setting operation while the range of change of laser power is being reduced. Alternatively, the recording power may be corrected by means of changing a target value and causing the setting means to repeatedly perform setting operation. Moreover, a recording strategy may be corrected in place of laser power or the target value being corrected (or along with corrections in the laser power and the target value). The recording power may also be corrected by again retrieving power in the vicinity of the recording power initially set by the setting means.

The invention will be more clearly comprehended by reference to the embodiment provided below. However, the scope of the invention is not limited to the embodiments.

DETAILED DESCRIPTION OF THE PREFERRED EMBODIMENT

An embodiment of the invention will be described hereinbelow by reference to the drawings while a DVD-R drive is taken as an example.

Figure 1:
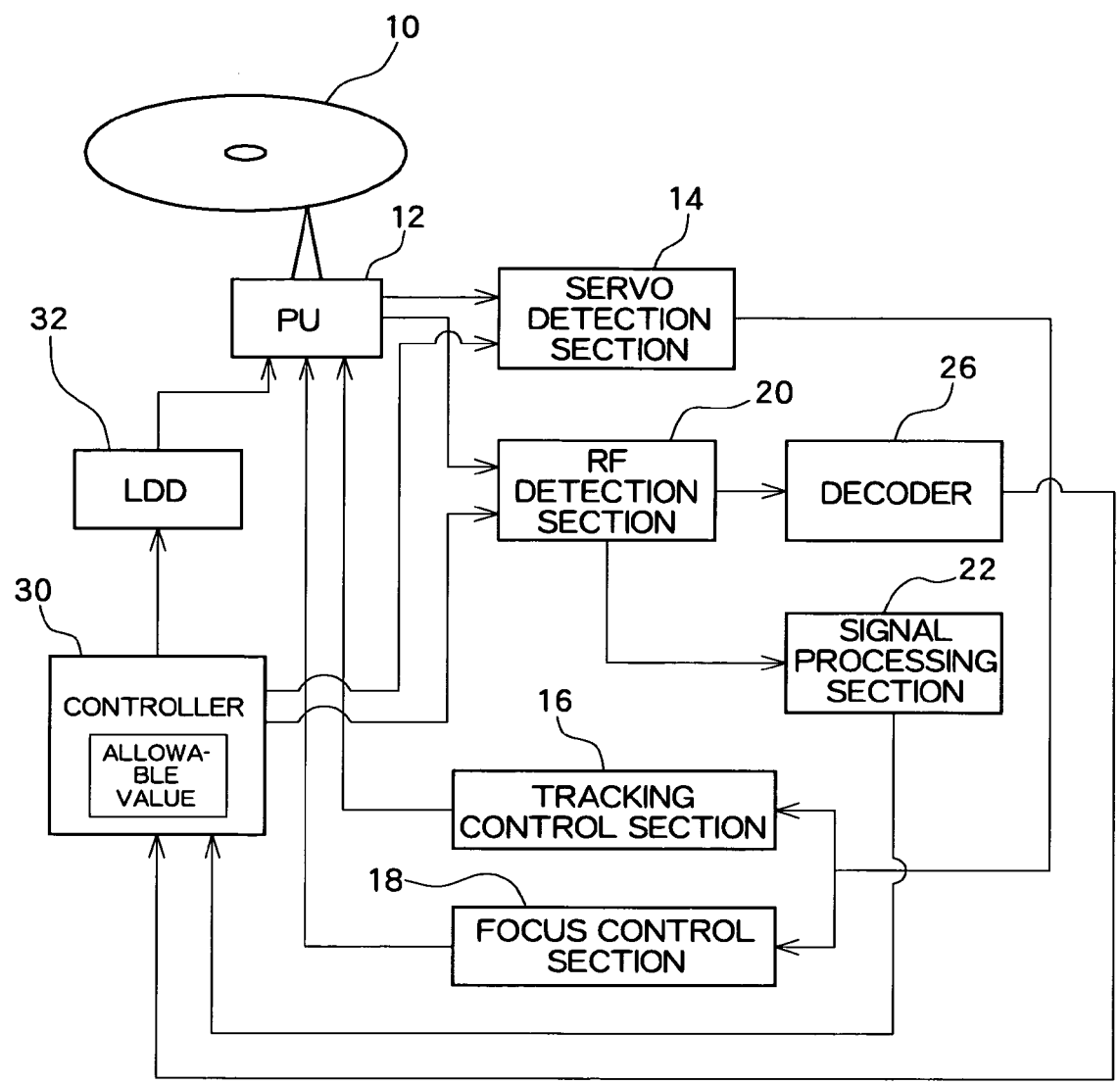
FIG. 1 is a block diagram showing the configuration of an optical disk apparatus.

FIG. 1 shows a block diagram showing the configuration of an optical disk apparatus according to the embodiment. An optical pickup (PU) 12 is disposed opposite an optical disk (DVD-R) 10. The optical pickup is configured to include a laser diode (LD) for emitting a laser beam onto the surface of the optical disk 10, and a photodetector. The laser diode is driven by a laser diode drive (LDD) circuit 32. At the time of reproduction of data, laser light of reproduction power is emitted to the optical disk 10. At the time of recording of data, laser light of recording power is emitted to the optical disk 10. A main beam photodetector and two sub-beam photodetectors are provided as photodetectors of the optical pickup 12, as in the case of a known configuration using a differential push-pull method. A detection signal corresponding to the quantity of reflected light is output to a servo detection section 14 and an RF detection section 20.

In accordance with a signal output from the optical pickup 12, the servo detection section 14 produces a tracking error signal TE and a focus error signal FE and outputs the tracking error signal TE to a tracking control section 16 and the focus error signal FE to a focus control section 18. The tracking error signal TE is produced according to the differential push-pull method. Specifically, the tracking error signal TE is produced from a difference between a push-pull signal of a main beam and push-pull signals of sub-beams. The focus error signal FE is produced according to the astigmatism method. The tracking error signal TE and the focus error signal FE can also be produced according to another method.

In accordance with the tracking error signal TE, the tracking control section 16 drives the optical pickup 12 toward the transverse direction of a track of the optical disk 10, thereby maintaining the optical pickup 12 in an on-track state. In accordance with the focus error signal FE, the focus control section 18 drives the optical pickup 12 in a focusing direction, thereby maintaining the optical pickup 12 in an on-focus state.

An RF detection section 20 amplifies a signal output from the optical pickup 12; specifically, a sum signal output from the photodetector that receives reflected light originating from the main beam, to thus produce a reproduction RF signal. The thus-produced reproduction RF signal is passed to a signal processing section 22 and a decoder 26. The signal processing section 22 detects a β value and the degree of modulation "m" from a reproduced signal of the test data when OPC (optimum power control) is performed and outputs the thus-detected value and the degree of modulation to a controller 30.

The controller 30 performs OPC by means of controlling the LDD circuit 32, the RF detection section 20, or the like, thereby determining optimum recording power on the basis of the β value and the degree of modulation "m," both being computed by the signal processing section 22, and the jitter output from the decoder 26. Thus, the LDD 32 is controlled to the optimum recording power. The test data to be used when OPC is performed are supplied from the controller 30, and random data of, e.g., 3T to 14T, are used as the test data.

The controller 30 verifies recording management data (RMD) recorded in a recording management area (RMA) of the optical disk 10. In accordance with a result of verification, the controller 30 determines whether to again perform OPC. When the result of verification of the RMD is positive, the controller 30 detects the number of errors in the RMD rather than immediately recording data in the data area on the optical disk 10. The thus-detected number of errors is compared with an allowable value. If the number of errors in the RMD is equal to or less than the allowable value, recording quality is determined to be maintained. Hence, data are recorded in the data area of the optical disk 10. Data to be recorded are delivered from the higher-level apparatus, such as a personal computer or the like, to the controller 30. After having been encoded, the data are supplied to the LDD 32. The number of errors in the RMD is counted by means of subjecting the data output from the decoder 26 to counting operation performed by an error correction circuit provided in the controller 30. The error correction circuit may be provided separately from the controller 30 in a position subsequent to the decoder 26. The predetermined allowable value can be stored in memory of the controller 30 in advance. However, the allowable value may be set so as to be adaptive to the optical disk 10. A method for setting the allowable value in an adaptive manner will be described later.

The decoder 26 has an equalizer and a binarizer. A predetermined frequency of the reproduced RF signal, specifically, the amplitude of the 3T signal, is boosted to be binarized, and the thus-binarized signal is demodulated and output to the controller 30. Here, demodulation of the binarized signal is performed by producing a synchronous clock signal in a PLL circuit and extracting the signal. The decoder 26 detects jitter by means of addition of a phase difference between the binarized signal and the synchronous clock signal and supplies the thus-detected jitter to the controller 30. The decoder 26 may output the binarized signal and the synchronous clock signal, and another jitter detection circuit differing from the decoder 26 may detect jitter. Alternatively, the controller 30 may detect jitter. The controller 30 outputs demodulated data output from the decoder 26 to a higher-level apparatus.

Figure 2:
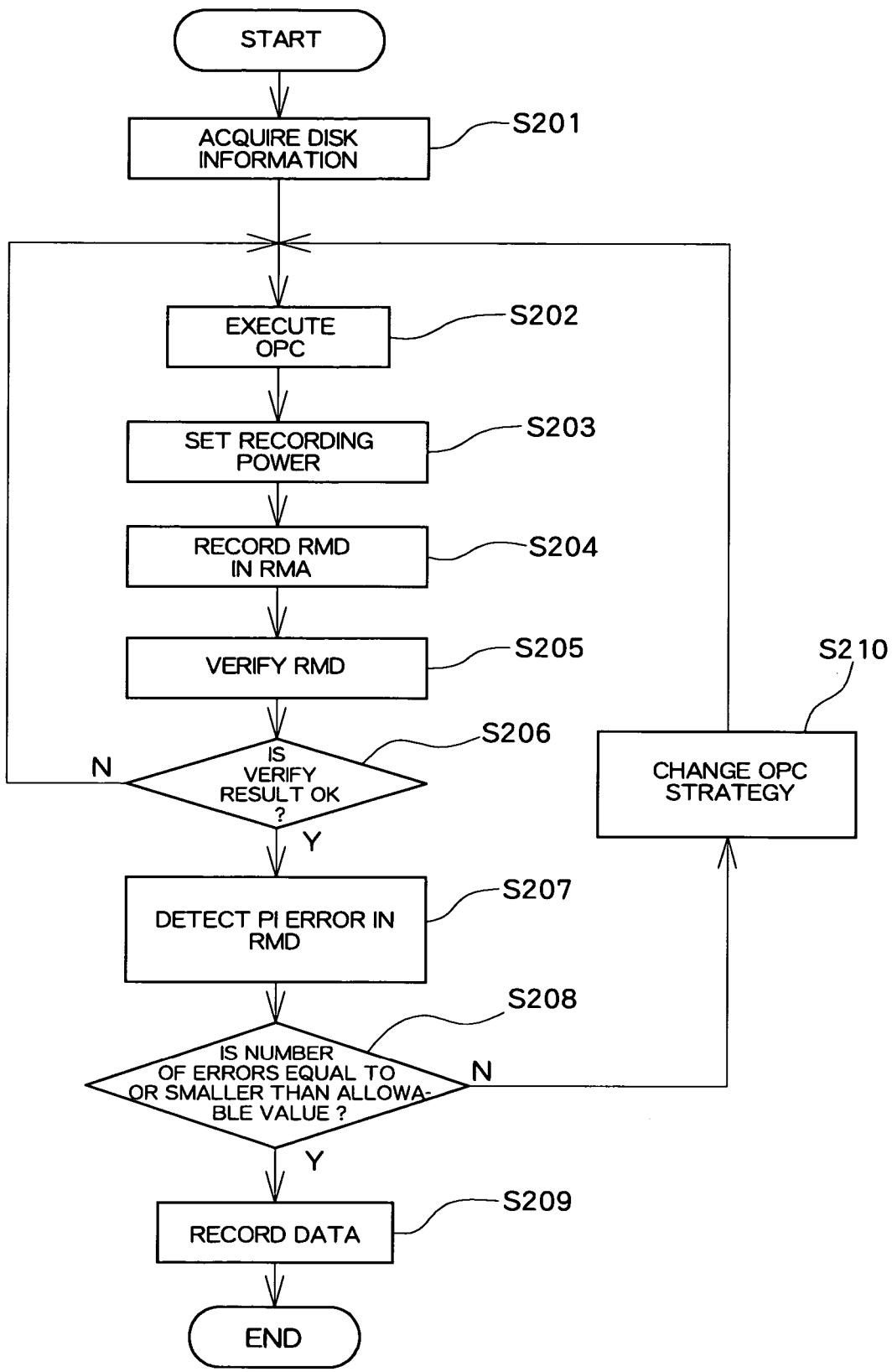
FIG. 2 is an flowchart pertaining to overall processing.

FIG. 2 shows a flowchart pertaining to data recording operation according to an embodiment. First, information about a loaded optical disk is acquired (S201). Information about an optical disk means the type of an optical disk, a manufacturer, a target value to be achieved when OPC is performed, or the like. A target value to be achieved at the time of OPC may be stored in memory of the drive beforehand on a per-manufacturer basis, and a target value corresponding to a manufacturer of interest may be read from the memory by means of acquiring manufacturer data.

After acquisition of disk information, OPC is performed (S202) During OPC, the controller 30 changes laser power in a plurality of levels; for example, in increments of 0.5 mW, thereby recording test data in the PCA of the optical disk 10 over the power level range of 5.0 mW to 12 mW. The test data are reproduced, and for each laser power level the quality of a reproduced signal is evaluated. Any of a β value, the degree of modulation "m," a γ value, and jitter can be used for the quality of a reproduced signal. In the embodiment, as mentioned above, the quality of a reproduced signal of the test data is evaluated through use of the jitter.

OPC operation will now be described.

Figure 3:
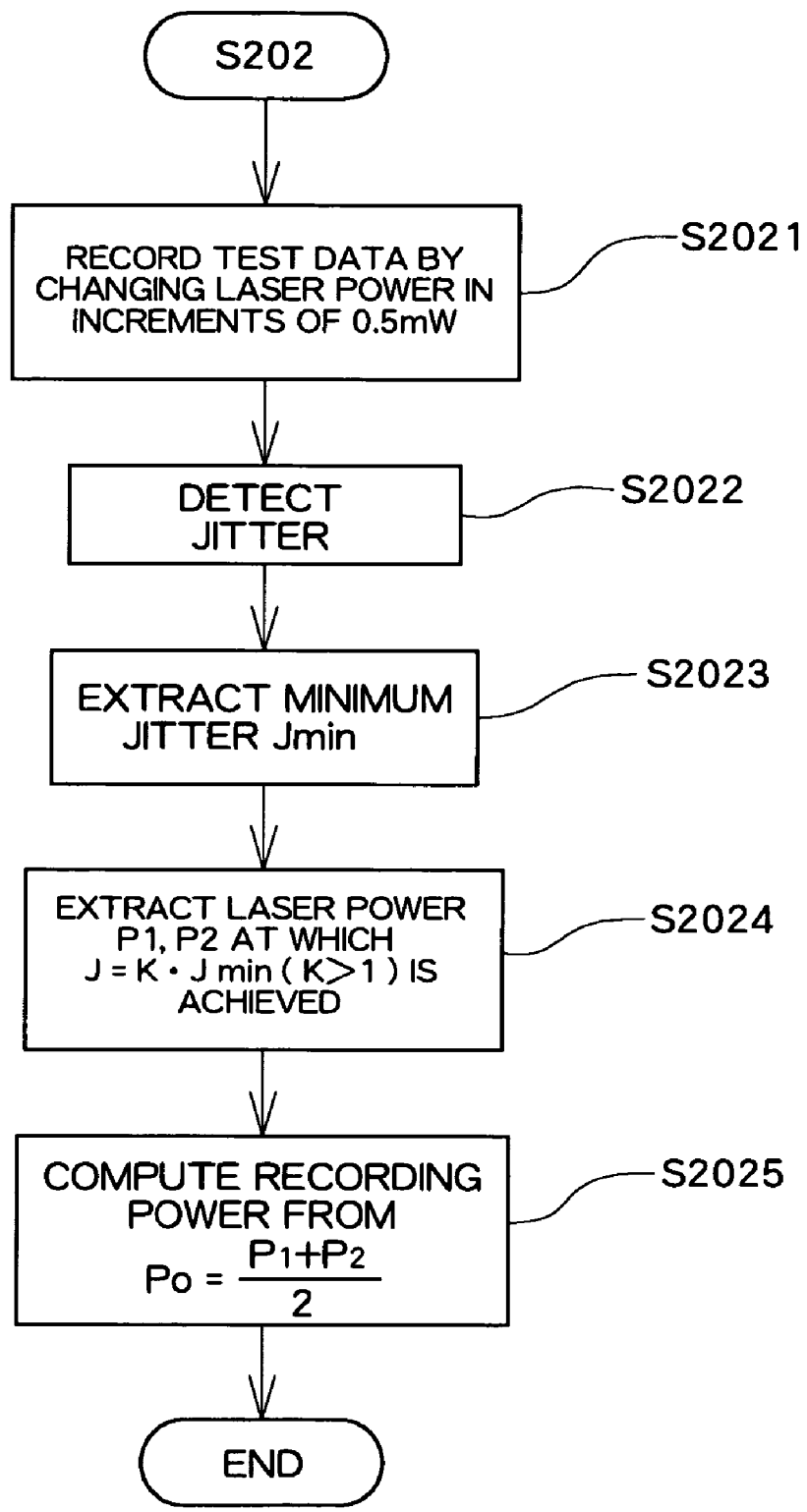
FIG. 3 is a detailed flowchart pertaining to OPC execution processing shown in FIG. 2.

FIG. 3 shows a flowchart of OPC processing pertaining to S202. Test data are recorded in a PCA (power calibration area) of the optical disk 10 by changing the laser power in increments of 0.5 mW (S2021). Here, the test data are random data of 3T to 14T. After recording of the test data, jitter is detected on a per-laser-power basis by means of reproducing the test data (S2022). Jitter is a sum of phase differences of the demodulated test data and the synchronous clock signal. After detection of jitter for each laser power level, the minimum jitter Jmin is extracted from among a plurality of thus-obtained jitter values (S2023). Laser power levels P1, P2—at which there is obtained jitter J=k·Jmin determined by multiplying the minimum value Jmin by a predetermined coefficient K (K>1)—are extracted (S2024). Thus, an intermediate power level Po=(P1+P2)/2 between the two laser power levels P1, P2 at which the jitter J is acquired is computed (S2025).

Figure 4:
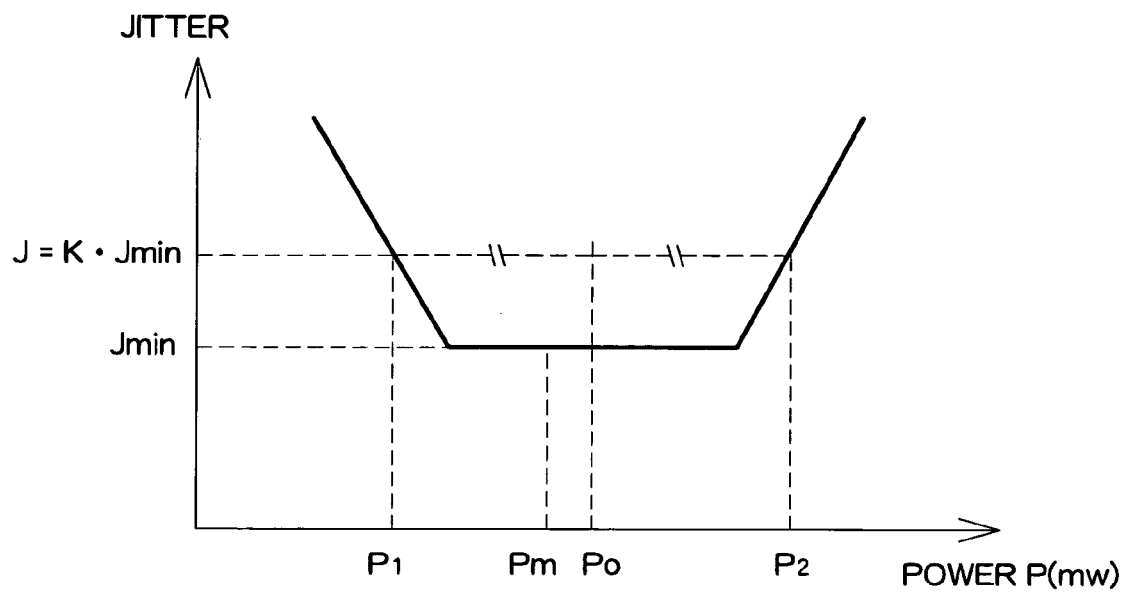
FIG. 4 is a descriptive view of the OPC execution processing using jitter.

FIG. 4 schematically shows OPC processing using the foregoing jitter. In the drawing, a horizontal axis represents laser power P (mW), and a vertical axis represents jitter. In general, jitter increases when laser power become deficient or excessive, and hence a downwardly-convex curve is plotted. The curve of jitter is not necessarily steep, and hence unique extraction of laser power at which jitter becomes minimum is not necessarily easy. For this reason, a minimum value Jmin is extracted from the range of values of jitter obtained at a plurality of discrete laser power levels, and the laser power levels P1, P2—at which there is obtained jitter J=k·Jmin determined by multiplying the minimum value Jmin by the coefficient K—are extracted. Under the assumption that the curve of jitter is substantially symmetrical with reference to the laser power, an intermediate value Po between the laser power levels P1, P2 is computed, thereby extracting the laser power Po which minimizes jitter with comparatively superior accuracy with a limited number of laser power levels.

Turning again back to FIG. 2, after the laser power Po has been extracted by means of performing OPC in the manner set forth, the controller 30 sets the laser power Po to the recording power Po (S203). After setting of the recording power, the controller 30 records management data; that is, one block of RMD, in the RMA of the DVD-R disk (S204). The thus-recorded one RMD block is verified (S205). When the RMD are read, the verification result is determined to be acceptable, and processing proceeds to the next step (S206). In contrast, when reading of the RMD has failed, the verification result is determined to be unacceptable, and OPC is again performed to thus reset the recording power (S202).

When the result of verification of the RMD is acceptable, processing proceeds to operation for recording data in the data area of the optical disk 10. In the embodiment, the controller 30 proceeds to operation for detecting errors in the RMD; specifically, PI errors (S207). Here, the PI errors are internal code parity errors to be imparted to one ECC block. An information field formed from 192 rows, each consisting of 172 bytes, exists in one ECC block. The internal code parity PI of 10 bytes is imparted to each of a total of 208 rows formed by combination of the information field formed from 192 rows and an external code parity formed from 16 rows. Through processing pertaining to S207, the internal code parity (PI) imparted to each of the 208 rows is checked, thus counting the number of errors. The maximum number of errors is 208. After detection of the number of PI errors in the RMD, a determination is made as to whether or not the number of errors is equal to or smaller than the allowable value (S208). The allowable value can be set to a fixed value, such as 35, beforehand, and stored in the memory provided in the controller 30. As mentioned above, the allowable value can be dynamically changed in accordance with the optical disk 10. Specifically, emboss data formed in a control data zone of the optical disk 10 are reproduced, and the allowable value is set on the basis of the number of errors in the emboss data. The emboss data are reproduced under the best conditions that do not depend on any recording conditions. Reproduction performance achieved by combination of the optical disk 10 and the drive can be evaluated with superior accuracy. The number of PI errors in the emboss data formed in the control data zone is detected, and a value determined by multiplying the number of PI errors per ECC block by a predetermined coefficient C (C>1) is taken as an allowable value. When the number of errors in the emboss data is high, reproduction performance achieved by combination of the optical disk 10 with the drive is originally considered to be low. In such a case, the allowable value is also set to a high value, whereby recording quality can be appropriately evaluated. Dynamic setting of the allowable value can be performed before the RMD are recorded in, e.g., the RMA.

If a result of comparison between the number of PI errors in the RMD with the allowable value is equal to or less than the allowable value, a determination is made that data can also be recorded without involvement of any problems. Data are recorded in the data area (including the lead-in section and the lead-out section) of the optical disk 10 at the recording power Po set in S203 (S209). When the number of PI errors is determined to exceed the allowable value in S208, the recording power set in S203 is not necessarily optimal recording power. Specifically, the recording power is determined to be able to enable reading of the RMD but unable to record data at a sufficiently low error rate. Alternatively, a recording margin is determined to be small, and high-quality recording of data over the entire data area of the optical disk 10 is determined to be difficult. After having changed an OPC strategy (S210), the controller 30 again performs OPC. In relation to the recording power obtained by re-execution of OPC, re-recording of the RMD, verification processing, and operation for evaluating the PI errors in the RMD are performed. When the number of PI errors has become equal to or less than the allowable value, data are recorded at the recording power achieved at that time (S209).

Several methods are available for changing the OPC strategy in S210. Examples of changing operation are described below.

<Operation for Reducing the Range of Change in Laser Power>

When the laser power has been changed in increments of, e.g., 0.5 mW, through first OPC, the test data are recorded through second OPC by means of changing the laser power within a range smaller than the range of change employed for the first OPC; for example, in increments (or decrements) of 0.2 mW. The test data may be recorded by changing the laser power in increments of 0.2 mW from 5.0 mW to 12.0 mW as in the case of the first OPC. However, OPC is preferably performed by changing the laser power by 0.2 mW positively and negatively with the recording power Po obtained through the first OPC being taken as a center. As a result, consumption of the PCA can be inhibited, thereby shortening the OPC time.

Figure 5:
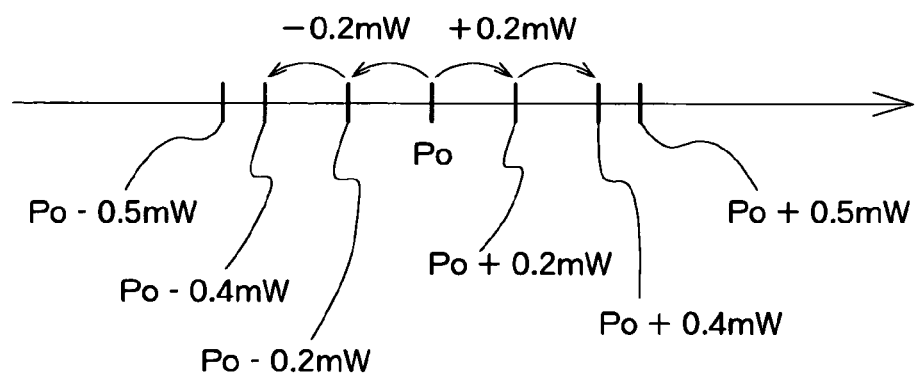
FIG. 5 is a descriptive view showing OPC re-execution processing.
Figure 6:
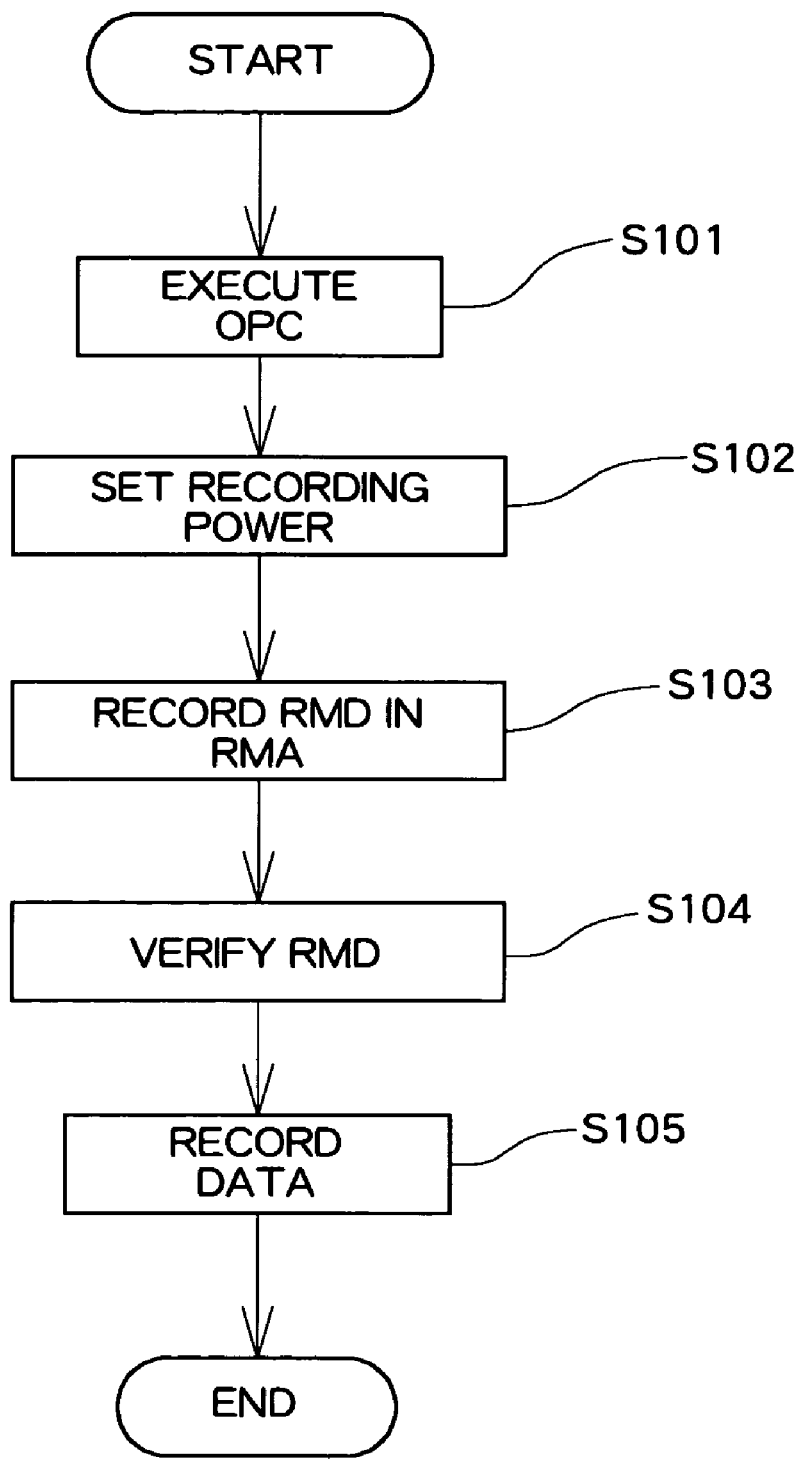
FIG. 6 is a processing flowchart employed in the related art.
Figure 7:
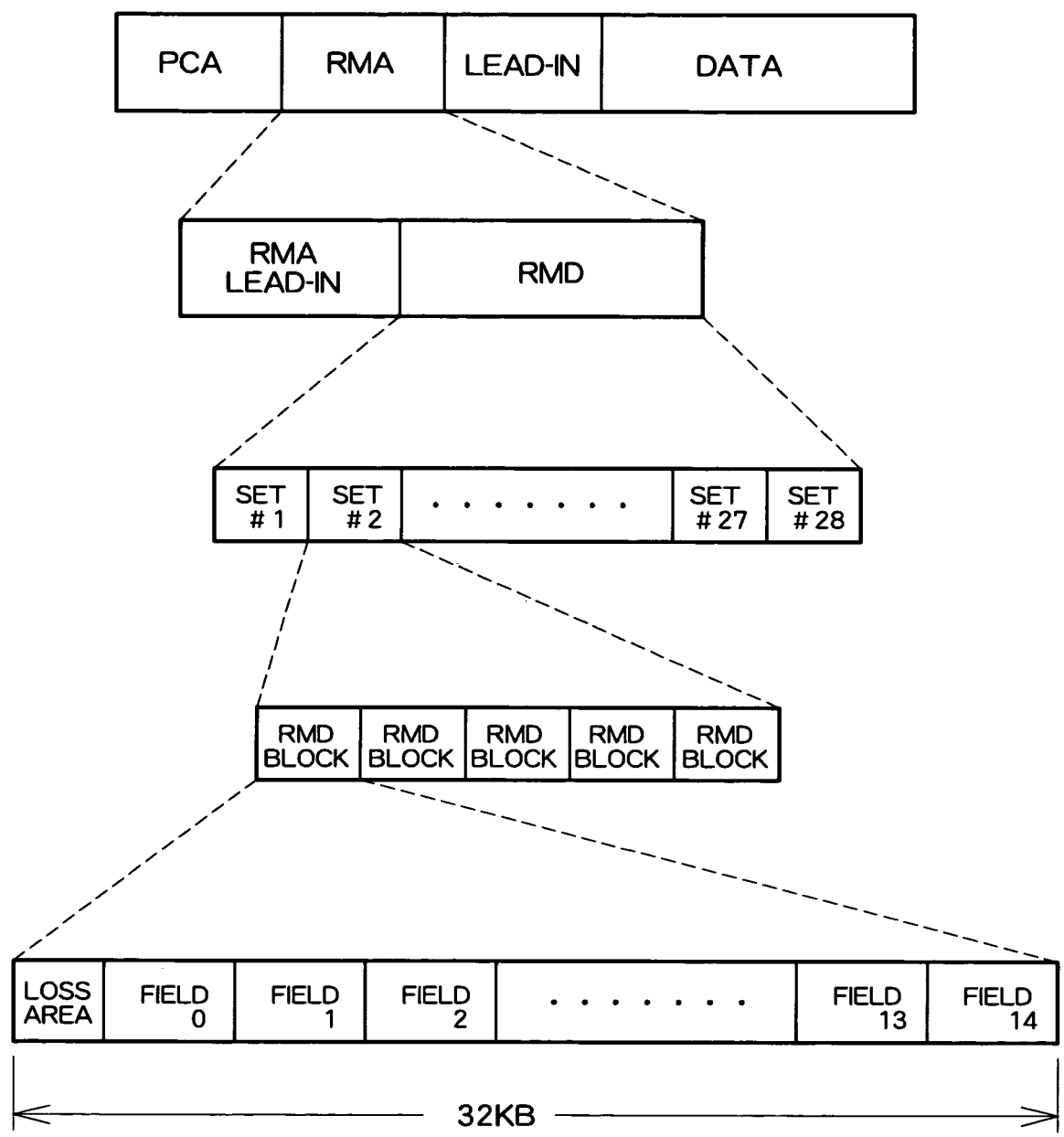
FIG. 7 is a descriptive view showing the format of an RMA on a DVD-RW disk.

FIG. 5 schematically shows the operation. The test data are recorded at the laser power that has been changed by −0.2 mW and −0.4 mW with reference to the recording power Po set through the first OPC and at the laser power that has been changed by +0.2 mW and +0.4 mW with reference to the same. The quality of reproduced signals of the test data recorded at a total of five levels of laser power (including the level Po) is evaluated in terms of jitter. Through an operation analogous to those performed in S2023 to S2025, the recording power is set again. Optimum recording power is considered to exist in the vicinity of the recording power Po obtained through the first OPC. Hence, optimum recording power can be again set within a short period of time by restricting an area to be retrieved to the neighborhood of the recording power Po and retrieving optimum recording power with a narrower range of change.

<Operation for Changing a Target Value>

Second OPC is an operation for changing a target value of the quality of the reproduced signal used for the first OPC. For instance, when the quality of a reproduced signal of the test data is evaluated through use of the β value, a target β value is incremented or decremented by a predetermined level or proportion with reference to the target β value employed for the first OPC. A determination as to whether or not the target value is increased or decreased is made such that the target value is made smaller if the disk is likely to cause a thermal waveform distortion. In contrast, if the disk is less likely to record data, the target value is made greater. The β value is defined by the following expression.

$$\beta \text{ value} = (|A1| - |A2|)/(|A1| + |A2|)$$

A1 designates a peak value of an AC-coupled RF signal; and A2 designates a bottom value of the same. In general, the higher the laser power, the greater the β value. When the number of PI errors is determined to exceed the allowable value through the determination operation pertaining to S208 and when the disk is less likely to record data (whether or not a disk is less likely to record data is determined on the basis of the manufacturer of the disk), the recording power Po set in S203 is considered to be lower than the optimum recording power. Recording power higher than that set in S203 is again set by increasingly correcting the target β value. Preferable second OPC is to again set laser power at which there is obtained a new target value aimed at a plurality of laser power levels in the vicinity of the recording power Po, as in the case of the previously-described example. A change in target value is not relevant to a case where OPC is performed on the basis of jitter. However, a change in target value is effective when a β value and the degree of modulation "m" are taken as parameters for evaluating a reproduced signal produced through OPC.

<Operation for Increasing or Decreasing the Laser Power by a Predetermined Level or Proportion>

When the number of PI errors is determined to exceed the allowable value in S208 rather than OPC being performed again, the recording power that has been increased or decreased with reference to the recording power Po set in S203 by a predetermined level (e.g., 0.3 mW) or a predetermined proportion (e.g., 10%) is taken as optimum recording power. After recording power has been reset in S210, processing proceeds to S204, where management data RMD are recorded in the RMA. After the management data RMD have been verified, the number of PI errors in the RMD is detected. A result of detection is again compared with the allowable value. When the optimum recording power has been determined by means of evaluating OPC on the basis of jitter, the RMD are reproduced, and the β value is measured. The β value may be determined to be large or small, whereby the laser power may be determined to be increased or decreased. Alternatively, increasing or decreasing of the laser power may be iterated in consideration of a change in the number of errors.

In the case of a DVD-RW disk, there arise many cases where the number of PI errors can be decreased by increasing the laser power. In contrast, in the case of a DVD-R disk, excessively-large laser power induces a thermal waveform distortion, which in turn sometimes increases the number of PI errors. Consequently, in the case of the DVD-R disk, when the number of PI errors has exceeded an allowable value, the only requirement is to reproduce the management data RMD, detect a β value of the management data RMD, and determine whether to decrease or increase the laser power in accordance with the size of the β value.

Moreover, OPC may be performed again by decreasing the rotational speed of the optical disk. OPC may be performed again by adjusting the target degree of modulation "m" and the target γ value instead of the β value. Alternatively, OPC may be performed again by means of changing the recording strategy (e.g., a light emission waveform rule of a recording pulse). The recording strategy can be set on the basis of a plurality of patterns of strategy information previously stored in the memory provided in the drive. A first pattern of recording strategy is used for first OPC, and a second pattern of recording strategy in which a pulse width is increased or decreased with reference to the first pattern of recording strategy is used at the time of second OPC. When data are recorded through use of a multi pulse, the recording strategy can be changed by changing the width and level of a leading pulse or the width and interval of a subsequent pulse.

As mentioned above, in the embodiment, even when the RMD are verified as being positive, the number of PI errors in the RMD is counted. Only when the number of errors has become equal to or less than the allowable value, data are recorded at the recording power set through OPC. Therefore, data can be recorded on the optical disk 10 with high quality. Even when the optical disk 10 is played back through use of another drive, data can be read without fail. Further, in the embodiment, RMD recording operation, which is indispensable for recording data, is utilized, thereby obviating a necessity for newly recording test data for evaluating recording quality and counting the number of errors in the test data. In order to count the number of errors, at least data corresponding to one ECC block must be recorded. However, the DVD-R drive records the RMD on a per-block basis, thereby satisfying this requirement.

The embodiment has described the invention by taking the DVD-R drive as an example of the optical disk apparatus. However, in the same fashion the invention can also be applied to a DVD-RW drive. In the case of a DVD-R disk, the RMD serving as the management data are recorded on a per-block basis as mentioned previously. In the DVD-RW disk, the RMD are first recorded in the RMA in the unit of five blocks and then recorded on a per-block basis. The reason why the RMD are first recorded in the unit of five blocks is that the DVD-RW drive records data erasure information in the first five blocks. In blocks subsequent to the first five blocks, data are recorded on a per-block basis in the same manner as in the case of the DVD-R disk.

Therefore, the only requirement is to detect the number of PI errors in one block and compare the thus detected number of errors with the allowable value. As a matter of course, for instance, the number of PI errors in five or eight blocks rather than the number of PI errors in one ECC block may be detected, and the result of detection compared with the allowable value. When the number of PI errors in eight blocks is detected and evaluated, the allowable value is preferably obtained by multiplying the allowable value of one block by eight. From the viewpoint of rapid processing, comparison between the number of PI errors in one block and the allowable value is preferable.

The invention is also applicable to a CD-R drive and a CD-RW drive. In the DVD-R drive and the DVD-RW drive, the RMD serving as management data are recorded in the RMA, and data are recorded in the data area. Therefore, detection of the number of PI errors in the RMD obviates operation for additionally writing test data to be used for evaluating errors in the test area or the data area for the trial. Neither the RMA nor the RMD exist in a CD-R disk or a CD-RW disk. Hence, such operation cannot be employed directly. In the CD-R disk and the CD-RW disk, a count area is provided adjacent to the PCA, and the count area manages how much of the PCA has been used, by means of counting the number of times test data are recorded. Accordingly, similar processing is preferably performed through use of the management data recorded in the count area. Specifically, the number of PI errors in the management data recorded in the count area is detected, and the result of detection is compared with the allowable value. If the result of detection exceeds the allowable value, the OPC is preferably performed again while the OPC strategy is changed. Even in this case, the number of errors is counted by utilization of originally-required operation for writing data into the count area, thus evaluating errors. Hence, recording quality can be ensured while unnecessary processing is omitted. Moreover, even a DVD+R disk and a DVD+RW disk can be subjected to the same processing through use of a TOC area corresponding to the RMA. Specifically, data corresponding to 16 sectors(=one ECC block) are recorded in the TOC area of the DVD+R/RW disk by one recording operation.

Moreover, according to the embodiment, when the number of PI errors in the RMD has exceeded the allowable value, OPC is performed through use of an algorithm differing from the first processing algorithm. An algorithm for second OPC may be changed in accordance with the number of errors in the RMD. For instance, when two types of allowable values are prepared; that is, TH1 and TH2 (TH1>TH2), and the number of PI errors in the RMD is noticeable to such an extent as to exceed TH1, OPC is again performed through use of an algorithm differing from that used for the first OPC. When the number of PI errors in the RMD is equal to or less than TH1 and exceeds TH2, OPC is again performed through use of the algorithm identical with that used for the first OPC. When the number of PI errors in the RMD exceeds TH1, recording power is increased uniformly by a predetermined amount. When the number of PI errors in the RMD exceeds TH2, there can also be performed operation, such as operation for again performing OPC while the recording power is changed in increments of 0.2 mW in both the negative and positive directions with reference to the recording power Po. In brief, the only requirement is to change a processing algorithm to be used for OPC adaptively in accordance with the number of PI errors in RMD.

Further, in the embodiment, when the RMD are recorded in the RMA, overwriting enables resetting of the recording power in consideration of an overwrite characteristic. Specifically, when the RMD are recorded in the RMA, RMD are newly written so as to overwrite the already-existing RMD, thereby verifying the RMD and counting the number of PI errors. The number of PI counts achieved at this time is the number of overwriting errors. Optimum power determined in consideration of an overwrite characteristic in the data area can be obtained by resetting the recording power Po such that the number of PI errors becomes equal to or less than the allowable value.

What is claimed is:

1. A data-recordable optical disk apparatus, comprising:
setting means which records test data in a test area on an optical disk and sets recording power in accordance with the quality of a reproduced signal obtained by reproducing said test data;
means for recording management data in a recording management area on said optical disk through use of said recording power;
means for verifying said recorded management data;
detection means for detecting the number of PI errors in said management data when a result of verification is positive;
comparison means for comparing the number of said errors with an allowable value;
correction means for correcting said recording power when the number of said errors exceeds said allowable value;
means for detecting the number of PI errors in emboss data by means of reproducing said emboss data existing in a predetermined area on said optical disk; and
means for setting said allowable value on the basis of the number of said PI errors in said emboss data.

2. An optical disk apparatus, comprising:
means which reproduces emboss data on said optical disk and counts the number of errors in said emboss data;
means for setting an allowable value on the basis of the number of errors in said emboss data;
means which records test data on said optical disk while changing laser power and sets recording power on the basis of the quality of a signal reproduced from said test data;
means for recording management data on said optical disk at said recording power;
means for reproducing said management data and counting the number of errors in said management data; and
means which again records said test data while changing said laser power in the vicinity of said recording power and which again sets said recording power on the basis of the quality of said signal reproduced from said test data when the number of errors in said management data exceeds said allowable value and which records data on said optical disk at said recording power when the number of errors in said management data becomes equal to or less than said allowable value.

3. An optical disk apparatus, comprising:
means for reproducing emboss data on said optical disk and counting the number of errors in said emboss data;
means for setting a first allowable value TH1 and a second allowable value TH2, TH1<TH2, in accordance with the number of errors in said emboss data;
means for recording test data on said optical disk while changing laser power, and setting recording power on the basis of the quality of a signal reproduced from said test data;
means for recording management data on said optical disk at said recording power;
means for reproducing said management data and counting the number of errors in said management data; and
means which, when the number of errors in said management data exceeds said first allowable value TH1, again records said test data while changing said laser power according to a method differing from that employed when the number of errors in said management data is equal to or less than said first allowable value TH1 and exceeds said second allowable value TH2; which again sets said recording power on the basis of the quality of said signal reproduced from said test data; and which records data on said optical disk at said recording power when the number of errors in said management data is equal to or less than said second allowable value TH2.

4. An optical disk apparatus, comprising:
means for storing a first allowable value TH1 and a second allowable value TH2, TH1<TH2, beforehand;
means which records test data on said optical disk while changing laser power and sets recording power on the basis of the quality of a signal reproduced from said test data;
means for recording management data on said optical disk at said recording power;
means for reproducing said management data and counting the number of errors in said management data; and
means which, when the number of errors in said management data exceeds said first allowable value TH1, again records said test data while changing said laser power according to a method differing from that employed when the number of errors in said management data is equal to or less than said first allowable value TH1 and exceeds said second allowable value TH2; which again sets said recording power on the basis of the quality of said signal reproduced from said test data; arid which records data on said optical disk at said recording power when the number of errors in said management data is equal to or less than said second allowable value TH2.

* * * * *

UNITED STATES PATENT AND TRADEMARK OFFICE
CERTIFICATE OF CORRECTION

PATENT NO. : 7,263,043 B2
APPLICATION NO. : 10/743590
DATED : August 28, 2007
INVENTOR(S) : Mitsuo Watanabe et al.

It is certified that error appears in the above-identified patent and that said Letters Patent is hereby corrected as shown below:

<u>Column 12, Line 7</u>
"allowable value TH2, TH1<TH2, in accordance with" should read as, --allowable value TH2, wherein TH1>TH2, in accordance with--.

<u>Column 12, Line 32</u>
"second allowable value TH2, TH1<TH2, beforehand;" should read as, --second allowable value TH2, wherein TH1>TH2, beforehand;--.

<u>Column 12, Line 49</u>
"said signal reproduced from said test data; arid which" should read as, --said signal reproduced from said test data; and which--.

Signed and Sealed this
Twenty-ninth Day of March, 2011

David J. Kappos
*Director of the United States Patent and Trademark Office*